United States Patent
Petty (10) Patent No.: US 9,602,537 B2
(45) Date of Patent: Mar. 21, 2017

(54) SYSTEMS AND METHODS FOR PROVIDING SECURE COMMUNICATION

(71) Applicant: VMware, Inc., Palo Alto, CA (US)

(72) Inventor: Darin Petty, Woodland Park, CO (US)

(73) Assignee: VMware, Inc., Palo Alto, CA (US)

( * ) Notice: Subject to any disclaimer, the term of this patent is extended or adjusted under 35 U.S.C. 154(b) by 187 days.

(21) Appl. No.: 13/840,207

(22) Filed: Mar. 15, 2013

(65) Prior Publication Data
US 2014/0281480 A1 Sep. 18, 2014

(51) Int. Cl.
*H04L 29/06* (2006.01)

(52) U.S. Cl.
CPC ........ *H04L 63/166* (2013.01); *H04L 63/0823* (2013.01)

(58) Field of Classification Search
CPC ............. H04L 63/0428; H04L 63/0823; H04L 63/062; H04L 63/166; H04L 9/3236; H04L 63/10; H04L 9/3247; H04L 9/0822; H04L 63/08
See application file for complete search history.

(56) References Cited

U.S. PATENT DOCUMENTS

| | | | |
|---|---|---|---|
| 7,533,257 B2 | 5/2009 | Lee et al. | |
| 7,840,804 B2 * | 11/2010 | Oikawa | G06F 21/31 380/277 |
| 7,933,845 B1 * | 4/2011 | Leon | G07B 17/00024 705/401 |
| 7,949,771 B1 * | 5/2011 | Chen | H04L 63/166 709/229 |
| 8,100,324 B1 * | 1/2012 | Leon | G06Q 30/04 235/375 |
| 8,601,566 B2 * | 12/2013 | Adusumilli | H04L 63/04 380/270 |
| 8,667,154 B1 * | 3/2014 | Chen | H04L 63/0823 709/229 |

(Continued)

OTHER PUBLICATIONS

Amann et al., No Attack Necessary: THe Surprising Dynamics of SSL Trust Relationship, © 2013, ACM, 10 pages.*

(Continued)

*Primary Examiner* — Jeffrey Pwu
*Assistant Examiner* — Baotram Tran (57) ABSTRACT

A client includes a security agent configured to create a client certificate that corresponds to one or more client identifiers. A server includes a server certificate and is in communication with the security agent. The server is configured to facilitate establishing an initial mutually authenticated transport layer security (TLS) session with the client based on the client certificate and the server certificate. The server is also configured to extract the client certificate from the security agent once the TLS session is established. The server is configured to store the certificate as being associated with only the corresponding client identifier(s) and to categorize the association between the client certificate and the corresponding client identifier(s) as being secure but not trusted for the client until the identity of the client has been verified. Moreover, the server is configured to receive an indication that the identity of the client has been verified.

14 Claims, 4 Drawing Sheets

(56) References Cited

U.S. PATENT DOCUMENTS

| | | | |
|---|---|---|---|
| 2003/0226017 A1* | 12/2003 | Palekar | H04L 63/0428 713/168 |
| 2004/0255037 A1* | 12/2004 | Corvari | H04L 63/0823 709/229 |
| 2005/0033957 A1* | 2/2005 | Enokida | H04L 63/0442 713/156 |
| 2005/0138351 A1* | 6/2005 | Lee | G06Q 20/0855 713/151 |
| 2006/0085848 A1* | 4/2006 | Aissi | G06Q 20/341 726/9 |
| 2006/0277417 A1* | 12/2006 | Oikawa | G06F 21/31 713/193 |
| 2006/0294381 A1* | 12/2006 | Mitchell | H04L 63/06 713/173 |
| 2007/0055867 A1* | 3/2007 | Kanungo | H04L 9/088 713/156 |
| 2007/0136573 A1* | 6/2007 | Steinberg | G06F 21/32 713/155 |
| 2007/0136800 A1* | 6/2007 | Chan | H04L 9/3236 726/10 |
| 2007/0180225 A1* | 8/2007 | Schmidt | H04L 9/321 713/152 |
| 2008/0034410 A1* | 2/2008 | Udupa | H04L 63/0272 726/5 |
| 2008/0077790 A1* | 3/2008 | Sato | H04L 63/0823 713/156 |
| 2008/0077796 A1* | 3/2008 | Lund | H04L 9/3273 713/173 |
| 2009/0013384 A1* | 1/2009 | Scurlock, Jr. | G06F 21/33 726/4 |
| 2009/0037997 A1* | 2/2009 | Agbabian | H04L 63/166 726/10 |
| 2009/0077383 A1* | 3/2009 | de Monseignat | H04L 63/0823 713/175 |
| 2009/0106557 A1* | 4/2009 | Leonard | H04L 12/585 713/179 |
| 2009/0222574 A1* | 9/2009 | Xiao | G06F 21/33 709/237 |
| 2009/0240936 A1* | 9/2009 | Lambiase | H04L 63/0272 713/156 |
| 2009/0319796 A1* | 12/2009 | Kim | H04L 63/0823 713/176 |
| 2010/0058064 A1* | 3/2010 | Kirovski | H04L 9/3073 713/176 |
| 2010/0077208 A1* | 3/2010 | Appiah | G06F 21/33 713/158 |
| 2010/0180121 A1* | 7/2010 | Chow | H04L 63/08 713/175 |
| 2010/0268932 A1* | 10/2010 | Bhattacharjee | H04L 63/0281 713/151 |
| 2010/0318784 A1* | 12/2010 | Rao | H04L 63/0281 713/151 |
| 2010/0333186 A1* | 12/2010 | Chan | H04L 9/3236 726/10 |
| 2011/0047373 A1* | 2/2011 | Karasawa | G06F 21/33 713/156 |
| 2011/0126003 A1* | 5/2011 | Engert | H04L 63/0823 713/156 |
| 2012/0036569 A1* | 2/2012 | Cottrell | G06F 21/41 726/7 |
| 2012/0324225 A1* | 12/2012 | Chambers | H04L 9/0891 713/169 |
| 2012/0330769 A1* | 12/2012 | Arceo | G06Q 20/4014 705/21 |
| 2013/0005443 A1* | 1/2013 | Kosta | G07F 17/3206 463/25 |
| 2013/0005458 A1* | 1/2013 | Kosta | G07F 17/3206 463/31 |
| 2013/0061041 A1* | 3/2013 | Inoue | G06F 21/44 713/156 |
| 2013/0067552 A1* | 3/2013 | Hawkes | H04L 63/166 726/7 |
| 2013/0212386 A1* | 8/2013 | Rastogi | H04L 9/3263 713/168 |
| 2013/0297513 A1* | 11/2013 | Kirillin | G06Q 40/02 705/67 |
| 2013/0305036 A1* | 11/2013 | Vos | H04L 63/166 713/151 |
| 2014/0101439 A1* | 4/2014 | Pettigrew | H04L 63/0823 713/156 |

OTHER PUBLICATIONS

Ekechukwu et al., A Notary Extension for the Online Certificate Status Protocol, © 2013, IEEE, 6 pages.*
Fernbach et al., Certificate Management in OPC UA Applications: An Evaluation of different Trust Models, © 2012, IEEE, 6 page.*
Fujishiro et al., Using Multiple Cryptographic Modules for Server-based Certificate Validation System, ICACT 2010, 6 pages.*
Gajek et al., Provably Secure Browser-Based User-Aware Mutual Authentication over TLS, © 2008, ACM, 12 pages.*
Georgiev et al., The Most Dangerous Code in the World: Validating SSL Certificates in Non-Browser Software, © 2012, ACM, 12 pages.*
Hussain et al., Extending TLS for Trust Delegation in Home Networks, ICACT2006, 6 pages.*
Lee et al., Wireless Certificate Management Protocol Supporting Mobile Phones, © 2008, IEEE, 7 pages.*
Park et al., Client Certificate and IP Address Based Multi-factor Authentication for J2EE Web Application, © 2007, SAS Institute, 8 pages.*
Thompson et al., Certificate-Based Authorization Policy in a PKI Environment, © 2003, ACM, 23 pages.*
Wu et al., Simulation for Intrusion-Resilient, DDoS-Resistant Authentication System (IDAS), Auburn University 2008, 8 pages.*

* cited by examiner

| Row | Type | Machine | Valid From | Valid To | Subject Name |
|---|---|---|---|---|---|
| 1 | Collector | | 7/23/2010 9:56:01 PM | 7/23/2020 9:56:01 PM | EMC Ionix SCM Collector Certificate DE79XXX |
| 2 | Enterprise | | 7/23/2010 9:56:01 PM | 7/23/2020 9:56:01 PM | EMC Ionix SCM Collector Certificate DE79XXX |
| 3 | Machine | DEV2K8COLL1 | 9/12/2012 5:14:01 AM | 9/12/2022 5:14:01 AM | Vmware VCM Agent Certificate A1A679XXXXX |

Column Grouping

⊗ Change Trust Status   ◇ Change Managing Agent Status   ⊗ Re-establish Mutual Authentication Filter | Define

FIG. 3

SYSTEMS AND METHODS FOR PROVIDING SECURE COMMUNICATION

BACKGROUND

A server, such as a web server or a database server, frequently communicates with and/or provides data to clients, such as web browsers. For example, web browsers may each transmit one or more web requests, such as a hypertext transfer protocol (HTTP) GET request, to the server. Each of the web requests may correspond to a request to receive data, such as, for example, a web page, an image, a video, or other piece of content. Upon receiving the web requests, the server can transmit the requested data to the respective clients such that each of the clients may display the results on a computer or other type of internet-enabled device that supports the client. To establish communication between the server and a client, the initiating party, the client or the server, has information to contact the other party, such as a computer name, web address, or IP address and other information to ascertain the identity of the other party, such as a certificate or other credentials. In order to ensure that communication between the server and the clients is secure, guarantees can be made that the communication sessions between the server and clients are secure. For example, the communication sessions can be secure by providing privacy and integrity.

Moreover, secure communication can be established when there is a confirmation that the client computer is actually the client identified by the client identifiers and/or the client certificate. Transport Layer Security (TLS) provides secure communication between the server and clients by using such client and server identifying information. However, TLS can only afford such security if the client certificate, for example, has been shared with the server prior to attempting to communicate (i.e., mutual authentication). Further, most applications using TLS approach security from the perspective of the client, wherein a verification is made to ensure that the client is communicating with the correct server. However, because it is possible for networks and computers to be compromised, when a server needs verification that it is communicating with the correct client, the server cannot be certain that the client it contacts on a network or the client contacting the server is really the one matching the client identifiers used to contact the server. The server cannot be certain even when the server has authenticated itself with the client using some form of credentials, such as a user name and/or a password, and even if the communication channel is secured by TLS.

SUMMARY

Systems and methods described herein enables secure communication between a server and one or more clients. A client includes a security agent that is configured to create a client certificate that corresponds to one or more client identifiers. A server that includes a server certificate is in communication with the security agent. The server is configured to facilitate establishing an initial mutually authenticated transport layer security (TLS) session with the client based on the client certificate and the server certificate. The server is also configured to extract the client certificate from the security agent when the initial mutually authenticated TLS session is established. The server is configured to store the certificate as being associated with only the corresponding client identifier(s). The server is also configured to categorize the association between the client certificate and the corresponding client identifier(s) as being secure but not trusted for the client until the identity of the client has been verified. Moreover, the server is configured to receive an indication that the identity of the client has been verified.

DETAILED DESCRIPTION

Figure 1:
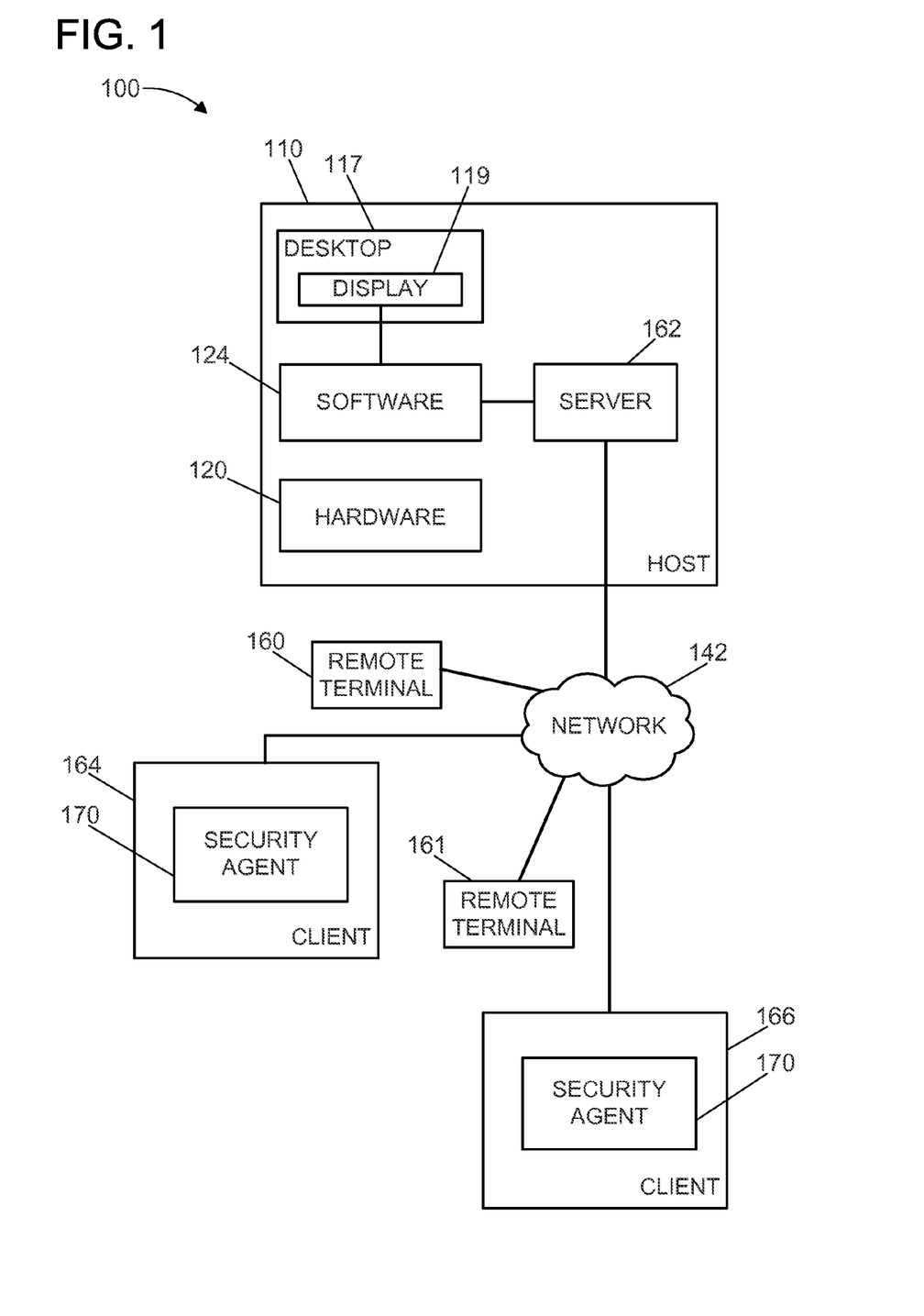
FIG. 1 is an exemplary system having a server in communication with one or more clients.

FIG. 1 shows an exemplary system 100 that includes a physical or virtual computer system or host 110. Host 110 includes hardware 120 and software 124 running on hardware 120 such that various applications may be executing on hardware 120 by way of software 124. Software 124 may be implemented directly in hardware 120, e.g., as a system-on-a-chip, firmware, field-programmable gate array (FPGA), etc. Hardware 120 includes at least one processor (not shown), wherein each processor is an execution unit, or "core," on a microprocessor chip. Hardware 120 also includes a system memory (not shown), which is a general volatile random access memory (RAM), a network interface (NIC), and other devices.

In the exemplary embodiment, one or more remote terminals, such as a remote terminal 160 and a remote terminal 161, enable end users to connect to, and interact with, host 110, wherein each remote terminal 160 and 161 is capable of communicating with host 110 via a network 142, which may be the Internet, a LAN, a WAN, VLAN, or any combination thereof. Remote terminals 160 and 161 may each be a server, desktop computer, laptop, mobile device, electronic tablet, thin client, or other similar device. Remote terminals 160 and 161 are capable of displaying the graphical user interface (GUI) of applications running inside host 110 to the end user at remote terminals 160 and 161 using a computer display (not shown) or similar device. Remote terminals 160 and 161 may also each be capable of receiving user input from the end user and transmitting the received user input to host 110.

Host 110 may provide at least one desktop 117 (only one being shown in FIG. 1) to a user of host 110. Desktop 117 is an interactive user environment provided by the applications running within host 110, and generally includes one or more screens or displays 119 (only one being shown in FIG. 1), but may include other outputs, such as audio, indicator lamps, tactile feedback, etc. Desktop 117 may also accept simulated inputs, such as simulated keyboard and mouse inputs received from remote terminals 160 and 161 and injected by software 124 into desktop 117. In addition to user input/output, desktop 117 may send and receive device data, such as input/output for a FLASH memory device local to the user, or to a local printer. In the exemplary embodiment, display 119 may be presented to an end user on a computer display of remote terminals 160 and 161.

In the exemplary embodiment, host 110 also includes a server, such as a server 162, that is in communication with software 124. In some implementations, server 162 may instead be implemented on a stand-alone server (not shown). Server 162 is in communication with one or more clients, such as a client 164 and a client 166, via network 142. Each client 164 and 166 has corresponding identifiers, such as a machine name or an IP address. The machine or client name could be DNS name or NETBIOS name, or could be the fully qualified version of either. The identifiers could also be any kind of proprietary identifiers, such as a "managed object id" and a "vcenter id" in a vSphere system, for example. Moreover, in the exemplary embodiment, each client 164 and 166 includes a security agent 170 installed therein and wherein security agent 170 includes a client certificate for each respective client 164 and 166. Security agent 170 may be manually installed by a user or system administrator or, alternatively, server 162 may install security agent 170 remotely using any form of credentials that will grant administrative authority to server 162, such as, for example, an administrative user name and a password. Other types of credentials may also be used, such as, for example, certificates, tokens, such as RSA tokens, or biometrics.

System 100 may include physical computer system, such as a server, a desktop computer, or a laptop that remotely accesses the system (100) from home or other locations. Alternatively (or additionally), system 100 may be implemented as part of a virtual system. In the latter case, any or all of the pictured components might be virtual rather than physical components. It should therefore be understood that the present invention can be implemented in a variety of contexts, During operation of system 100, server 162 communicates with clients 164 and 166. For example, server 162 may connect to each of clients 164 and 166 and communicate with clients 164 and 166 to receive data from clients 164 and 166. More specifically, server 162 may transmit one or more requests to clients 164 and 166, wherein each request corresponds to a request for data or an instruction to take an action. In some circumstances, a third party, such as a potential hacker, may gain some control of network 142 and/or a client and intervene in the communication between server 162 and, for example, client 164. For example, a hacker may obtain control of network 142 and local administrative rights for client 166 and alter client identifiers for client 166, such as a machine name or an IP address, to reflect the machine name and/or IP address of client 164 prior to server 162 establishing a trust relationship with client 164. Therefore, since client 164 is not bound to server 162 by some means, such as a client certificate, when server 162 attempts to make an initial request with client 162 to negotiate a transport layer security (TLS) session with client 164, the client identifier(s), such as the machine name, for client 164 now resolves to the address of client 166 (i.e., the imposter). Server 162 may then attempt to negotiate a TLS session without, for example, a client certificate from client 166. Such a negotiation may succeed if client 166 is a valid client and can accept a server certificate for server 162, such as a server certificate for the TLS session. Client 166 may then identify itself as client 164 to server 162 by indicating to server 162 that it is client 164. A third party can later remove his or her changes to network 142. Server 162 may have then contact with client 164 and perform an action as indicated or requested by the false data that had been provided by the compromised client 166.

As explained in more detail below with respect to FIG. 4, server 162 facilitates an automated mechanism to establish secure communications with client 164 and/or client 166 such that a potential hacker may not intervene in the communications in the manner described above. In the exemplary embodiment, server 162 facilitates a mechanism for creating a client certificate for each client 164 and 166 and facilitates establishing their trustworthiness. Server 162 also facilitates postponing an enrollment of clients 164 and 166 until each have been bound to server 162 by their respective client certificates and an identity of the client has been verified. For example, when server 162 initially contacts one of the clients, such as client 164, server 162 will not have a client certificate associated with the client identifiers that correspond to client 164. Moreover, during this initial contact, security agent 170 on client 164 will provide a client certificate for client 164 by (a) creating a new self-signed certificate for client 164, (b) requesting and acquiring a client certificate signed by server 162 during an initial handshake, or (c) locating a pre-existing certificate issued by a certificate authority known to server 162. This client certificate can then be used with the server certificate for server 162 to establish a mutually authenticated TLS session between server 162 and client 164. Server 162 extracts the client certificate and associates it with the client identifiers for client 164. As such, server 162 binds the client certificate to client 164 and client 164 is considered attached to server 162. More specifically, in the exemplary embodiment, server 162 stores the client certificate as being associated with only the corresponding client identifiers and categorizes the association between the client certificate and the corresponding identifiers as being secure, but not trusted, for client 164 until the identity of client 164 has been verified. Accordingly, while client 164 is deemed attached to server 162, client 164 is not officially enrolled with server 162 until an identity of the client is verified. Thus, until a status of the client is changed to trusted, restricted information, such as passwords, will not be sent to client 164 from server 162.

In one embodiment, server 162 may also generate an output 200 (shown in FIG. 2) with a categorization of exemplary outputs that may be generated by server 162, which may be displayed to a user or administrator via, for example, display 119 on host 110. For example, output 200 may be a visual output that includes a grid 202 having a plurality of columns. More specifically, in the exemplary embodiment, a first column 204 and a second column 206 provide information about each of the clients, such as clients 164 and 166. The information may include, for example, the machine type, name and identification for each of clients 164 and 166, and other client identifiers as appropriately needed. A third column 208, a fourth column 210, and a fifth column 212 provide information about the certificate associated with the machine, such as validity dates (columns 208 and 210), and a subject name and fingerprint (column 212). A sixth column 214 includes an icon, such as a handshake icon 215, that indicates the trust state of the machine and the corresponding certificate pair. For example, if icon 215 is included next to the machine or client, the machine or client is deemed secure and trusted. As such, the user may visually see the status of each of the clients with respect to being trusted or not trusted.

After the initial contact, server 162 will not communicate with client 164 without the specific certificate bound to client 164. Because only the authentic client (i.e., client 164) has access to the private key corresponding to the client certificate, it is not possible for a different machine or client, such as client 166, to impersonate client 164. The only opportunity for another client (e.g., client 166) to impersonate client 164 is prior to the initial contact between server 162 and client 164, in which an identity of client 164 is fixed. However, if an impersonation of client 164 by, for example, client 166 happens before client 164 is attached to server 162, the impersonator can continue the ruse until the impersonation is discovered. However, until the impersonation by client 166 is discovered, server 162 will not communicate with client 164 because client 164 does not have the client certificate attached to the client identifiers for client 164, which is currently with client 166, the imposter. Thus, while server 162 may be able to establish a connection with client 166 as if client 166 is client 164, client 166 is still not able to be enrolled with server 162 since a user or system administrator will discover that client 166 is not client 164 and will not mark it as trusted. However, in a situation when client 164 is attached to server 162, a user or system administrator may verify client 164 to enable client 164 to be deemed enrolled with server 162. More specifically, the user may examine client 164 or examine the information returned to server 162 from client 164 using known techniques to verify the identity of client 164.

Figure 2:
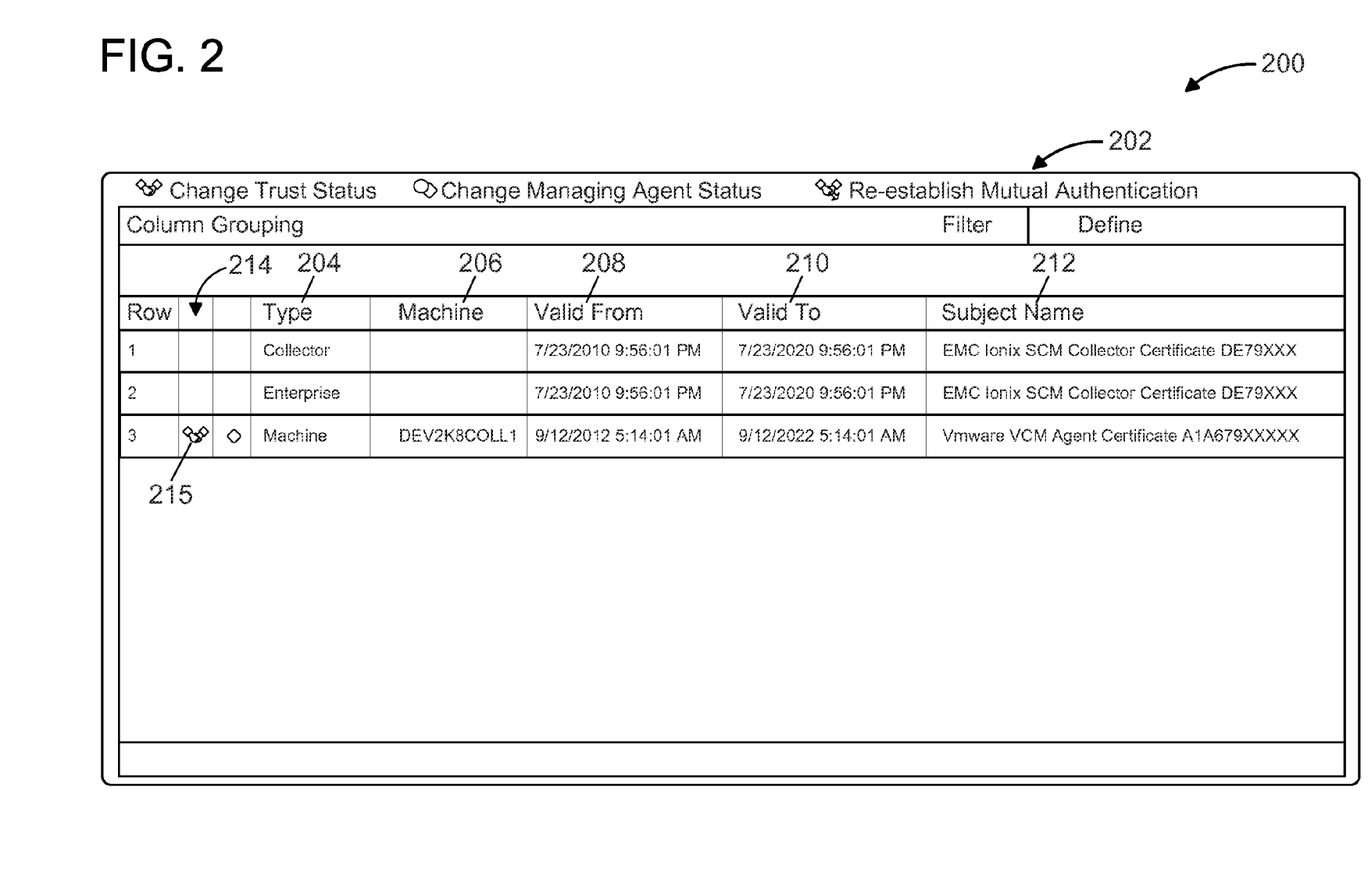
FIGS. 2 and 3 are exemplary outputs that may be generated by the server shown in FIG. 1.

Once client 164 has been verified, the user may update output 200 to a trusted status for client 164 and client 164 is deemed enrolled. For example, in one embodiment, the user may use a mouse cursor (not shown) or a keyboard (not shown) to select the machine or client in output 200 on display 119 to change its status.

Figure 3:
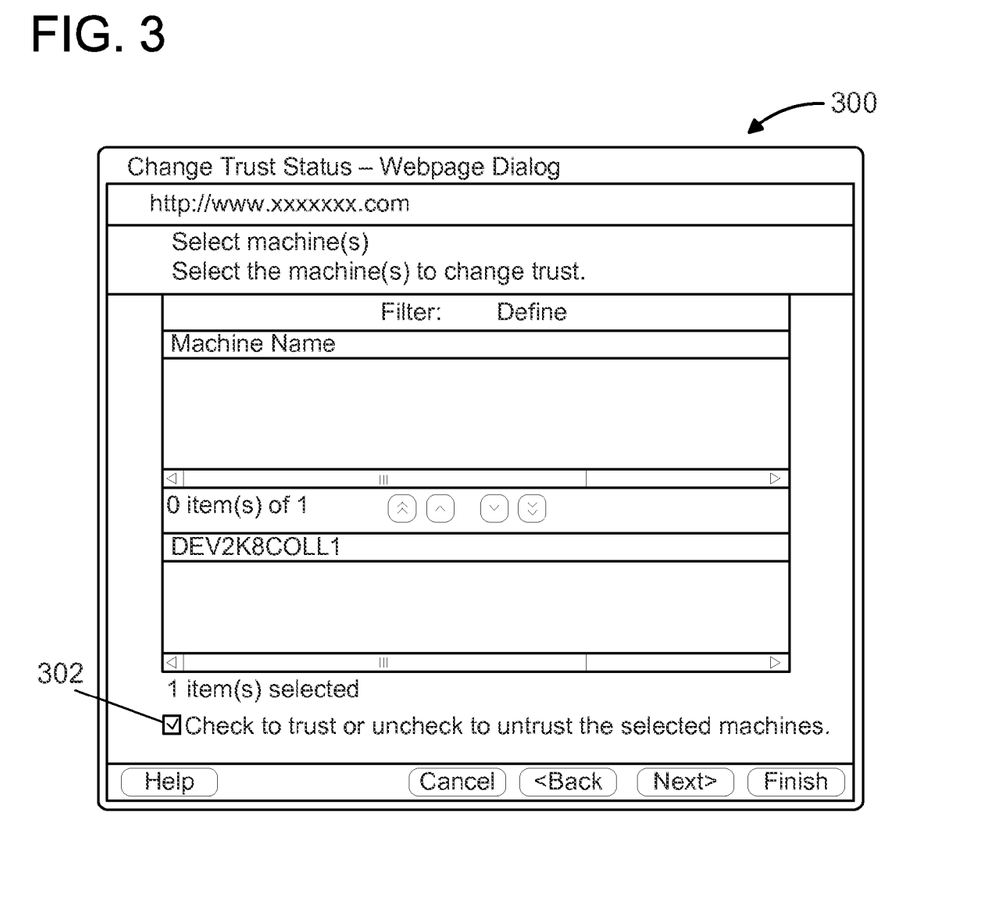

After the machine or client is selected, server 162 may generate an output 300 (shown in FIG. 3) that can be displayed to the user using display 119. In output 300, the user can select the machine in which the status is to be changed and select the machine or client as being trusted or untrusted. For example, output 300 may include an area, such as a box 302, that is configured to receive an input from the user. The user can use a mouse cursor or keyboard to click on box 302 on display 119 to change the status from not trusted to trusted. Once client 164 is deemed secure and trusted, client 164 is deemed enrolled with server 162. System 100 can then function with secure communication between server 162 and client 164 without having required the administrator to perform a manual configuration within system 100.

Figure 4:
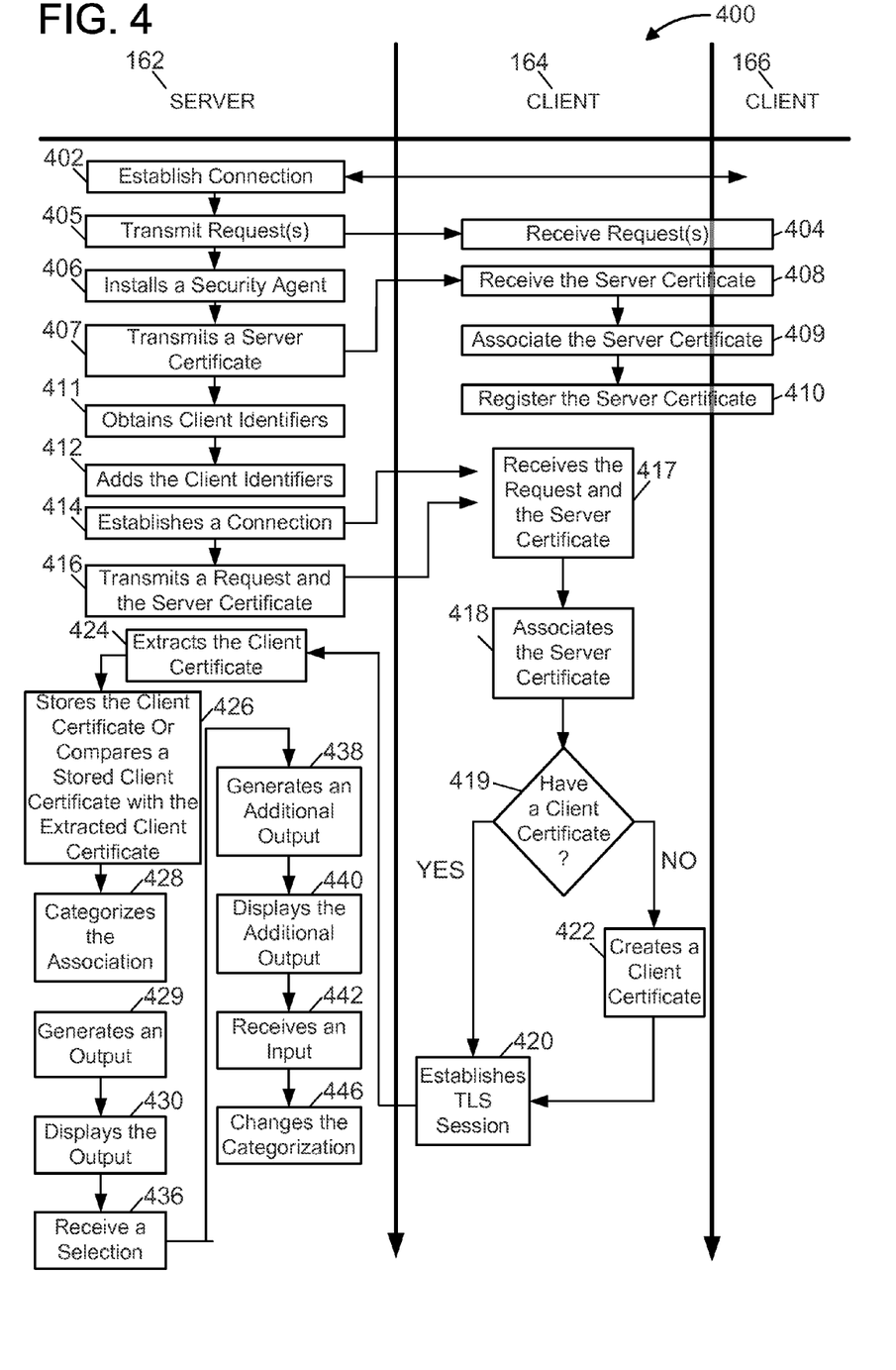
FIG. 4 is a swimlane diagram of an exemplary method of providing secure communication between the server and the client(s) shown in FIG. 1.

FIG. 4 shows a swimlane diagram 400 of an exemplary method for providing secure communication between server 162 located within host 110 (shown in FIG. 1) and clients 164 and 166. This method may be embodied within a plurality of computer-executable instructions stored in one or more memories, such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors to perform the functions described herein.

In operation 402, server 162 establishes a connection with clients 164 and 166 to facilitate communications between server 162 and each of clients 164 and 166. For example, each connection between clients 164 and 166 and server 162 may be a two way TCP connection to enable server 162 to transmit information or data regarding content to clients 164 and 166. In operation 405, server 162 transmits one or more requests to clients 164 and 166. In operation 404, clients 164 and 166 receive the requests. In operation 406, server 162 installs an agent, such as security agent 170 (shown in FIG. 1), into each client 164 and 166. While the exemplary embodiment illustrates server 162 installing security agent 170 to each client 164 and 166, security agent 170 may be installed using other techniques. For example, a system administrator may install an agent to each of client 164 and 166 manually. In the exemplary embodiment, server 162 may install security agent 170 on each client 164 and 166 remotely using any form of credentials that will grant administrative authority to clients 164 and 166. For example, server 162 may use a user name and a password for each client 164 and 166.

In operation 407, server 162 transmits a server certificate to clients 164 and 166. Clients 164 and 166 each receive the server certificate in operation 408 and, in operation 409, clients 164 and 166 each associate the server certificate with server 162. Clients 164 and 166 each register the server certificate as trusted in operation 410. In the exemplary embodiment, the credentials used to allow installation of security agent 170 in each client 164 and 166 is sufficient to establish that the server certificate is trusted and, therefore, valid for future TLS sessions. The installation and association of the server certificate can be done using other techniques. For example, a system administrator may install the server certificates manually, or the certificates can be installed using operating system or network capabilities such as a PKI (Public Key Infrastructure) system or Group Policy actions.

In operation 414, server 162 establishes a connection with client 164. More specifically, in the exemplary embodiment, server 162 connects to security agent 170 in client 164. In operation 416, server 162 transmits a request to client 164 along with the server certificate that was previously registered with client 164, wherein the request corresponds to a request for a client certificate from client 164 in order to establish a TLS session. In operation 417, client 164 receives the request and, in operation 418, client 164 checks to ensure that the server certificate, associated with server 162, is previously registered as trusted and authorized. In operation 419, client 164 identifies whether it has a client certificate. If client 164 has a client certificate, then client 164 attempts to establish a TLS session with server 162 using the client certificate in operation 420. If client 164 does not have a client certificate, then client 164 creates a client certificate in operation 422. More specifically, in the exemplary embodiment, security agent 170 in client 164 creates a new key pair and self-signed certificate. Thereafter, client 164 uses the created client certificate to establish a TLS session and any future TLS sessions with server 162 pursuant to operation 420. More specifically, a mutually authenticated TLS session is established in operation 420.

After the mutually authenticated TLS session is established, server 162 extracts the client certificate from the TLS context in operation 424. In operation 426, server 162 stores the client certificate as being associated or as being bound with only the client identifiers that server 162 had previously obtained for client 164. If server 162 already has a client certificate stored, at 426, server 162 compares the extracted client certificate with the stored client certificate to confirm that they match. If they do not match, communication is terminated. In operation 428, server 162 then categorizes the association between the client certificate and the corresponding client identifiers as being secure but not trusted for client 164 until the identity of client 164 has been verified. In future communication with client 164, server 162 will require that the TLS session be negotiated using the same client certificate.

A system administrator may visually see the categorization. For example, in operation 429, server 162 generates an output, such as output 200 (shown in FIG. 2) of the categorization. Server 162 displays output 200, in operation 430, on display 119 (shown in FIG. 1) such that the user may analyze the categorization and determine if any clients need to be verified. For example, at a future time, the user can verify client 164. More specifically, in one embodiment, the user can examine the client certificate for client 164 using known techniques. The user may also examine information gathered by server 162 from client 164 and/or examine client 164 using known techniques to determine that client 164 is not an imposter.

Upon verifying client 164, the user can change the current categorization. For example, the user may provide an input upon seeing output 200. In the exemplary embodiment, the user may use a mouse cursor (not shown) or a keyboard (not shown) to select client 164 on output 200 that is being displayed. Server 162 receives the selection in operation 436 and, in response, may generate an additional output, such as output 300 (shown in FIG. 3) in operation 438. Server 162 displays output 300 in operation 440 to the user on display 119. The user can then use a mouse cursor or the keyboard to change the status of client 164 from untrusted to trusted. More specifically, the user may provide an input by selecting and clicking on box 302 (shown in FIG. 3). In operation 442, server 162 receives the input regarding the change in status of client 164. Server 162 then changes the categorization to reflect that client 164 is trusted in operation 446. More specifically, server 162 deems that an identity of client 164 as being secure and accurate, and therefore trusted. As such, client 164 is now considered enrolled with server 162. As such, server 162 can safely send restricted information, such as a password, to client 164. Server 162 may repeat and perform operations 414-446 with client 166 to enroll client 166 as well in order to also ensure restricted communications between server 162 and client 166 can be achieved.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising:
   a processor;
   a client configured to comprise a security agent that is configured to create a client certificate that corresponds to one or more client identifiers by creating a key pair and a self-signed certificate upon being connected to a server; and
   a single server comprising a server certificate, wherein said server is in communication with said security agent, and wherein said single server is configured to, via the processor:
   facilitate establishing an initial mutually authenticated transport layer security (TLS) session with said client based on the client certificate and the server certificate comprising:

install said security agent on said client using one or more credentials;
transmit said server certificate to said client, wherein said one or more credentials are sufficient to establish that said server certificate is trusted and valid for future TLS sessions between said single server and the said client; and
establish the initial mutually authenticated TLS session with said client by connecting to said security agent;
transmit a request comprising said server certificate, said request corresponding to a request for said client certificate;
extract the client certificate from said security agent when the initial mutually authenticated TLS session is established;
store the client certificate as being associated with only the one or more client identifiers;
categorize the association between the client certificate and the one or more client identifiers as being secure but not trusted for said client until an identity of said client has been verified;
receive an indication that the identity of said client has been verified; and
change a categorization of said client to secure in response to receiving said indication.

2. The system of claim 1, wherein said server is further configured to provide an output, via a user interface, of the categorization to a user.

3. The system of claim 2, wherein said server is configured to receive the indication that the identity of said client has been verified by receiving an input from a user, via the user interface, to change the categorization for said client from not trusted to trusted.

4. The system of claim 1, wherein the one or more credentials includes a username and a password.

5. The system of claim 1, wherein the one or more client identifiers include a client name or an internet protocol address.

6. At least one non-transitory computer-readable storage medium having computer-executable instructions embodied thereon, wherein, when executed by at least one processor of a server, the computer-executable instructions cause the at least one processor to:
facilitate establishing an initial mutually authenticated transport layer security (TLS) session between a single server that includes a server certificate and a client that is configured to comprise a security agent that is configured to create a client certificate that corresponds to one or more client identifiers by creating a key pair and a self-signed certificate upon being connected to said single server, wherein the initial mutually authenticated TLS session is established based on the client certificate and the server certificate and comprises:
install the security agent on the client using one or more credentials;
transmit said server certificate to said client, wherein said one or more credentials are sufficient to establish that said server certificate is trusted and valid for future TLS sessions between said single server and the said client; and
establish the initial mutually authenticated TLS session with said client by connecting to said security agent;
transmit a request comprising said server certificate, said request corresponding to a request for said client certificate;
extract the client certificate from the security agent when the initial mutually authenticated TLS session is established;
store the client certificate as being associated with only the one or more client identifiers;
categorize the association between the client certificate and the one or more client identifiers as being secure but not trusted for the client until an identity of the client has been verified;
receive an indication that the identity of the client has been verified; and
change a categorization of said client to secure in response to receiving said indication;
wherein said establishing, said install, said extract, said store, said categorize and said receive are performed by said single server.

7. The at least one non-transitory computer-readable storage medium of claim 6, wherein the computer-executable instructions further cause the at least one processor to provide an output, via a user interface, of the categorization to a user.

8. The at least one non-transitory computer-readable storage medium of claim 7, wherein the computer-executable instructions cause the at least one processor to receive the indication that the identity of the client has been verified by receiving an input from a user, via the user interface, to change the categorization for the client from not trusted to trusted.

9. The at least one non-transitory computer-readable storage medium of claim 6, wherein the one or more credentials includes a username and a password.

10. The at least one non-transitory computer-readable storage medium of claim 6, wherein the one or more client identifiers include a client name or an internet protocol address.

11. A method of providing secure communication between a server and a client, the method comprising:
facilitating establishment of an initial mutually authenticated transport layer security (TLS) session between a single server that includes a server certificate and a client that is configured to comprise a security agent that is configured to create a client certificate that corresponds to one or more client identifiers, wherein the initial mutually authenticated TLS session is established based on the client certificate and the server certificate, said facilitating comprising:
installing the security agent on the client, by the server, using one or more credentials;
transmitting said server certificate to said client, wherein said one or more credentials are sufficient to establish that said server certificate is trusted and valid for future TLS sessions between said single server and the said client; and
establishing the initial mutually authenticated TLS session with said client by connecting to said security agent enabling creation of the client certificate by creating a key pair and a self-signed certificate;
transmitting a request comprising said server certificate, said request corresponding to a request for said client certificate;
extracting the client certificate from the security agent when the initial mutually authenticated TLS session is established;
storing the client certificate as being associated with only the one or more client identifiers;

categorizing the association between the client certificate and the one or more client identifiers as being secure but not trusted for the client until an identity of the client has been verified;

receiving an indication that the identity of the client has been verified; and changing a categorization of said client to secure in response to receiving said indication;

wherein said facilitating of said establishment, said installing, said extracting, said storing, said categorizing and said receiving are performed by said single server.

12. The method of claim 11, further comprising providing an output, via a user interface, of the categorization of the association to a user.

13. The method of claim 12, wherein receiving an indication further comprises receiving an input from a user, via the user interface, to change the categorization for the client from not trusted to trusted.

14. The method of claim 11, wherein installing the security agent on the client further comprises installing the security agent on the client using a username and a password.

* * * * *